(12) United States Patent
Goodwin, III et al.

(10) Patent No.: US 6,469,617 B1
(45) Date of Patent: Oct. 22, 2002

(54) METHOD OF RESTORING INFORMATION FOR DISPLAY BY AN ELECTRONIC PRICE LABEL

(75) Inventors: John C. Goodwin, III, Suwanee, GA (US); Terry L. Zimmerman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/394,539

(22) Filed: Sep. 10, 1999

(51) Int. Cl.[7] .......................... G08B 29/00; G06F 17/60
(52) U.S. Cl. ..................... 340/5.91; 340/5.92; 340/525; 235/383; 345/962; 705/16; 705/20; 705/21
(58) Field of Search ................................. 340/5.91, 5.9, 340/5.92, 525; 705/16, 20, 21, 23, 28; 235/383, 385, 462.15, 472.01; 345/962

(56) References Cited

U.S. PATENT DOCUMENTS

| | | | |
|---|---|---|---|
| 4,002,886 A | 1/1977 | Sundelin | 235/383 |
| 4,500,880 A | 2/1985 | Gomersall et al. | 340/5.91 |
| 4,924,363 A | 5/1990 | Kornelson | 362/125 |
| 5,172,314 A | 12/1992 | Poland et al. | 340/5.91 |
| 5,448,226 A | 9/1995 | Failing, Jr. et al. | 340/5.91 |
| 5,729,696 A * | 3/1998 | Goodwin, III et al. | 705/20 |
| 5,794,211 A | 8/1998 | Goodwin, III et al. | 705/23 |
| 6,047,263 A * | 4/2000 | Goodwin, III | 705/20 |
| 6,317,724 B1 * | 11/2001 | Goodwin, III et al. | 705/20 |

* cited by examiner

*Primary Examiner*—Donnie L. Crosland
(74) *Attorney, Agent, or Firm*—Paul W. Martin

(57) ABSTRACT

A method of restoring display information to an electronic price label which stores temporarily removed display information and sends it to the electronic price label following a temporary period. The method includes the steps of determining whether a memory of the electronic price label contains primary display information during the temporary display period, and if the memory of the electronic price label does not contain the primary display information during the temporary display period, sending a message to the electronic price label containing the primary display information for display following the temporary display period.

15 Claims, 3 Drawing Sheets

METHOD OF RESTORING INFORMATION FOR DISPLAY BY AN ELECTRONIC PRICE LABEL

BACKGROUND OF THE INVENTION

The present invention relates to electronic price label (EPL) systems, and more specifically to a method of restoring information for display by an EPL.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs ate coupled to a central server from where information about the EPLs is typically maintained in an EPL data file. Price information displayed by the EPLs is obtained from a price look-up (PLU) data file and stored within an EPL price change record.

EPLs are also being used to display more than just price information. For example, retailers are using EPLs to display promotional information in order to more effectively market associated merchandise items. Retailers must also display status and other information for the benefit of employees.

However, EPLs have limited memory capacity for storing the many types of information which must be displayed. For example, a typical EPL has four data registers which can simultaneously store, at most, two types of information. Therefore, it would be desirable for providing a method of temporarily displaying new information and returning to previously displayed information despite the memory capacity limitation of an EPL.

SUMMARY OF THE INVENTION

In accordance with the teachings of the present invention, a method of restoring information for display by an electronic price label (EPL) system is provided.

The method includes the steps of determining whether a memory of the electronic price label contains primary display information during the temporary display period, and if the memory of the electronic price label does not contain the primary display information during the temporary display period, sending a message to the electronic price label containing the primary display information for display following the temporary display period.

An electronic price label system includes an EPL including a memory containing a plurality of different locations for storing different pieces of information, and a computer which sends a first message to the EPL containing temporary display information to be displayed by the EPL during a temporary display period, determines whether primary display information was removed by the EPL from the memory to store the temporary display information, and, if the primary display information was removed, stores the primary display information in a data file, reads the primary display information in the data file at a predetermined time, and sends a second message to the EPL containing the primary display information for display following the temporary display period.

The primary display information may include primary display characters, display instructions, or both.

It is accordingly an object of the present invention to provide a method of restoring information for display by an EPL.

It is another object of the present invention to provide a method of interrupting display of information by an EPL in order to display a different type of information.

It is another object of the present invention to provide a method of tracking information removed from a memory in the EPL during a temporary display period for later replacement.

It is another object of the present invention to provide a method of displaying a different type of information and returning to the previously displayed information which compensates for insufficient memory capacity in EPLs.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
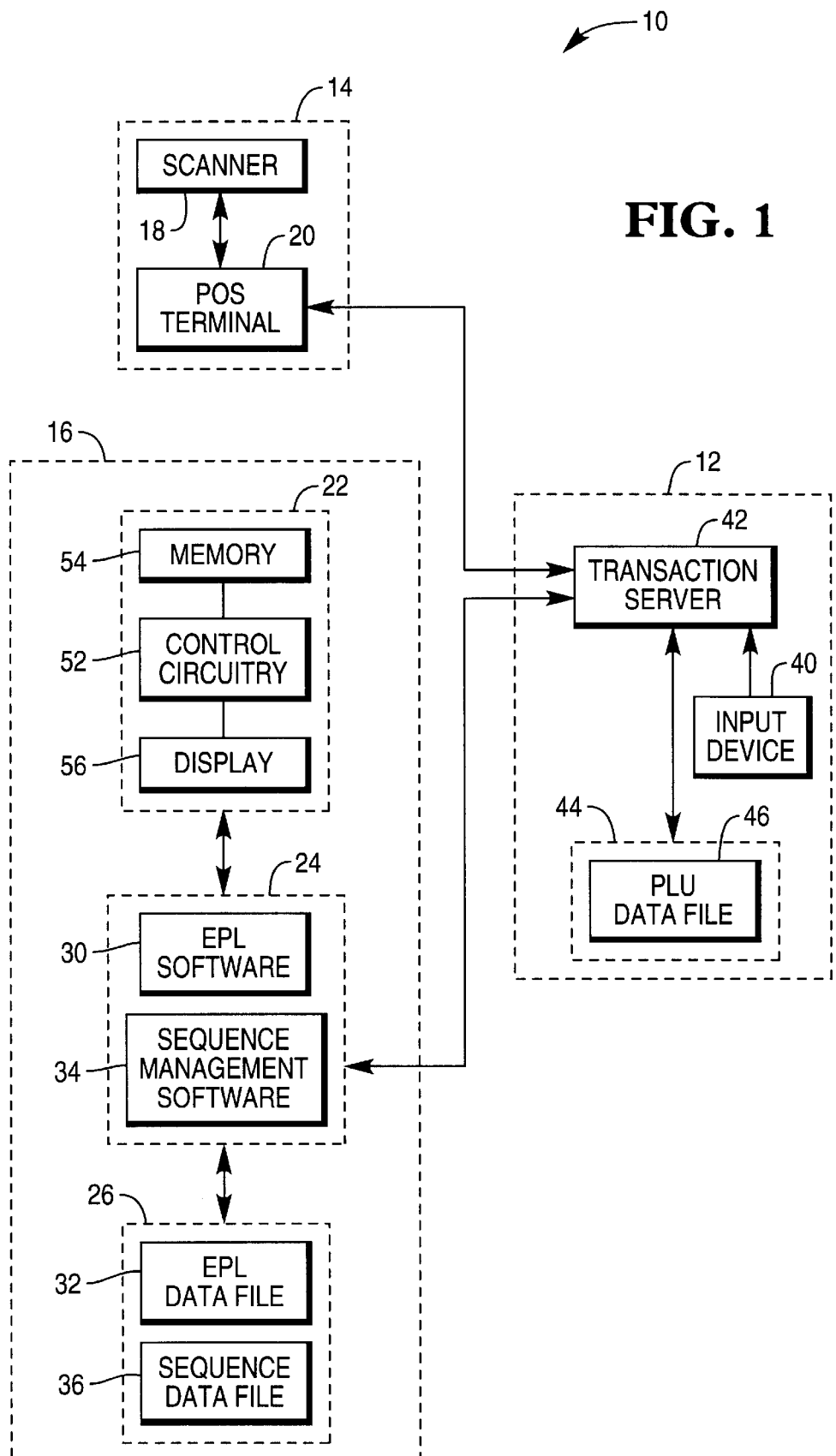
FIG. 1 is a block diagram of a transaction processing system.

Referring now to FIG. 1, a first embodiment of transaction system 10 primarily includes host computer system 12, point-of-sale (POS) system 14, and EPL system 16. Here, components 12, 14, and 16 are shown as separate components that are networked together, but they may also be combined in different ways to form less components. Thus, host computer system 12 may be a POS terminal which doubles as a host computer for network of other POS terminals. Also, host computer system 12 and EPL system 16 may be combined into a single system.

POS system 14 includes bar code reader 18 and terminal 20.

EPL system 16 primarily includes EPLs 22, host EPL terminal 24, and EPL storage medium 26.

EPLs 22 include control circuitry 52, data memory 54 and displays 56.

Control circuitry 52 receives and transmits messages from EPL terminal 24 and controls display of information by display 56. Control circuitry 52 stores data within the messages, such as price and promotional information, in data memory 54.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting data to EPLs 22. EPL software 30 obtains prices in price look-up (PLU) data file.

Host EPL terminal 24 also executes restoration management software 34 which manages restoration of information in EPLs 22. Under the present invention, restoration management software 34 tracks automatic or operator-initiated messages which cause EPLs 22 to remove one or more types of currently displayed information and temporarily store and display one or more types of new information. Following the temporary display period, restoration management software 34 sends previously displayed data and display instructions to EPLs 22 in order to restore the previously displayed data into the memories of EPLs 22.

Restoration management software 34 tracks whether data has been removed from memories 54 of EPLs 22 in restoration data file 36.

EPL storage medium 26 stores EPL data file 32 and restoration data file 36. EPL storage medium 26 and is preferably a fixed disk drive.

EPL data file 32 contains EPL identification and checksum information. Checksum information is calculated from price information in PLU data file 46. EPL data file 32 identifies information that is currently stored and displayed by EPLs 22.

Host computer system 12 includes PLU storage medium 44, transaction server 42, and input device 40.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2A:
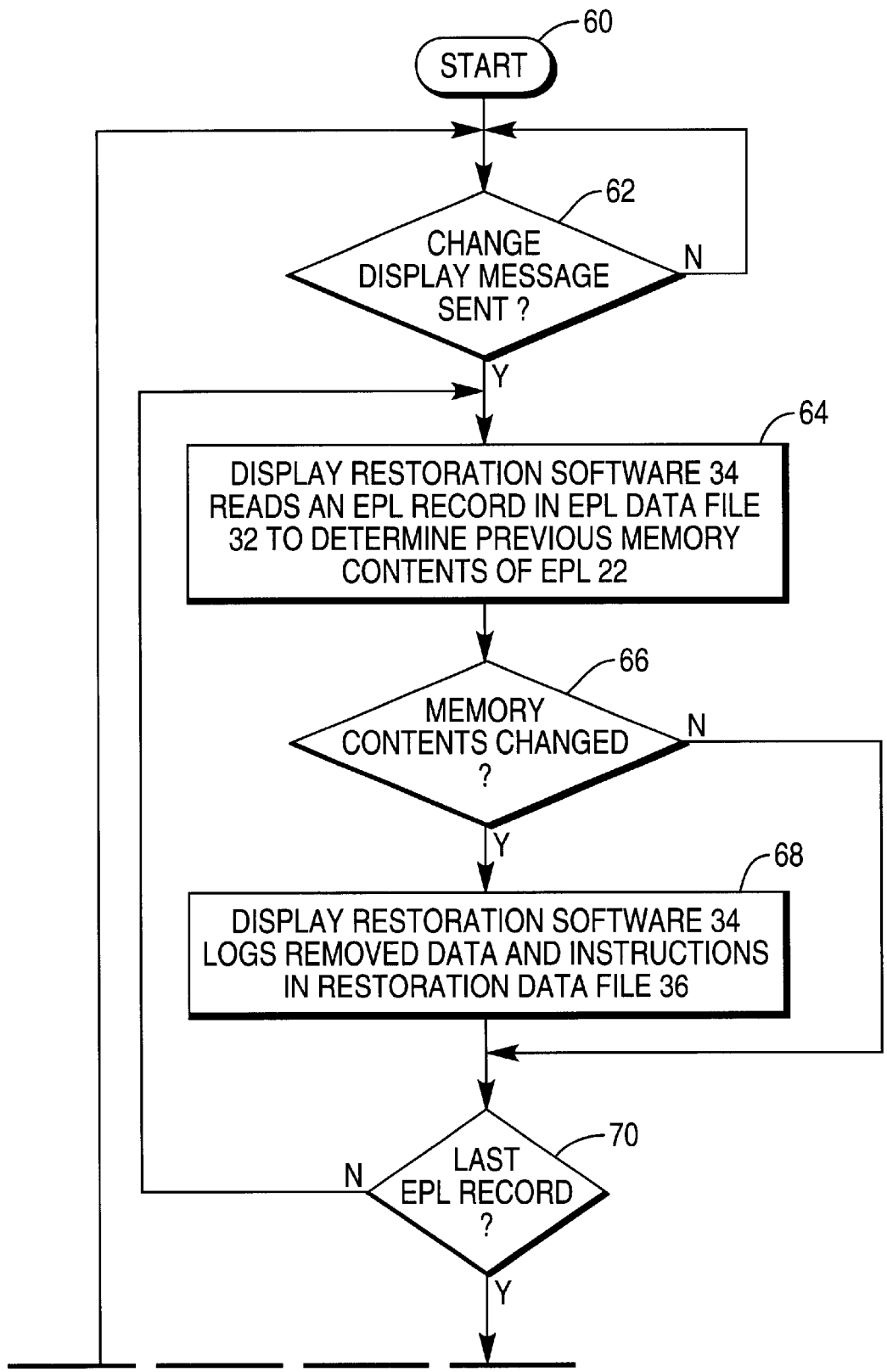
FIG. 2 is a flow diagram illustrating the method of the present invention.
Figure 2B:
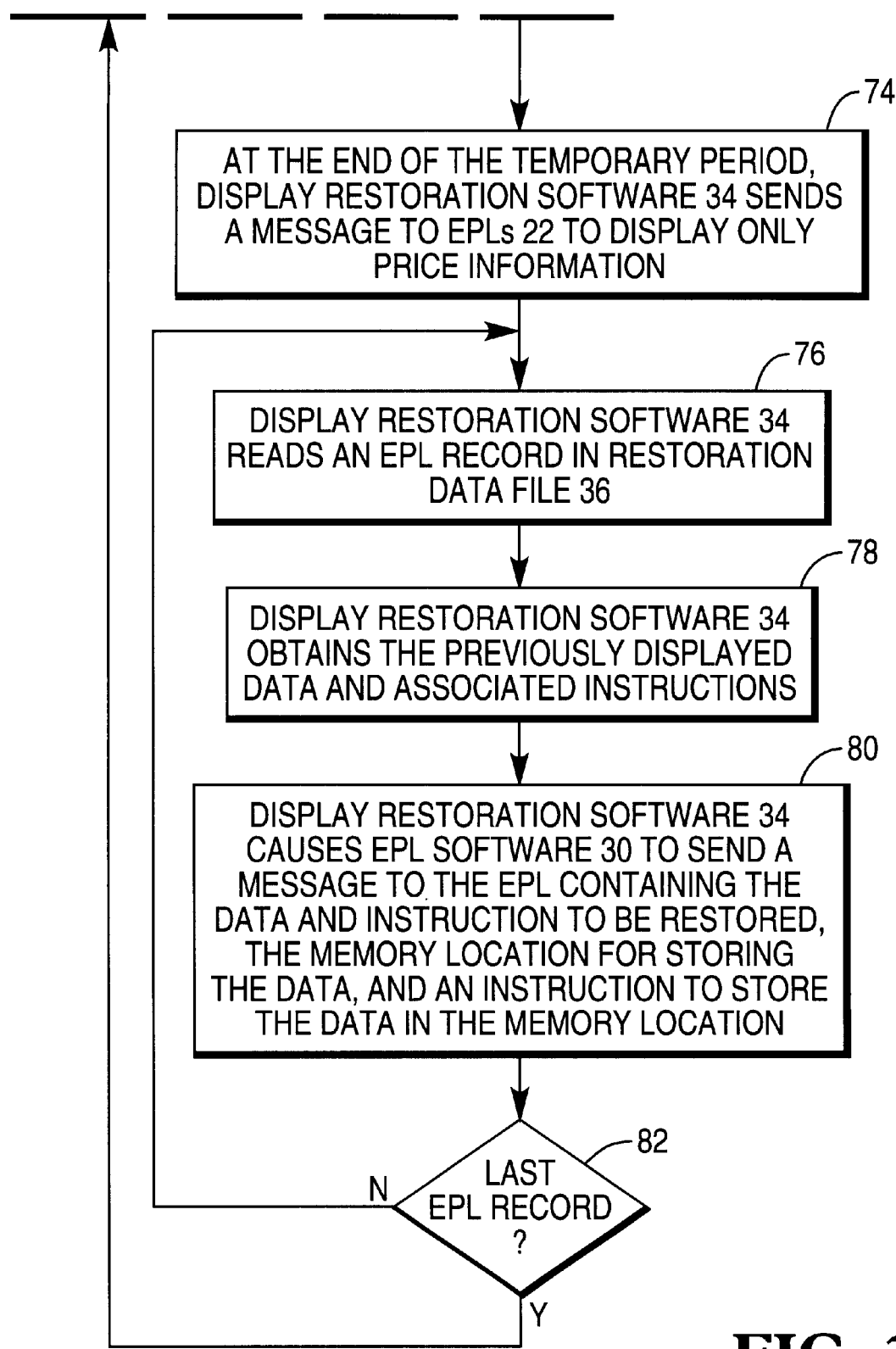

Turning now to FIG. 2, the operation of display restoration software 34 is illustrated beginning with START 60.

In step 62, display restoration software 34 waits for an indication that a change display message has been sent to EPLs 22 by EPL software 30. The change display message would typically be a broadcast message addressed to all EPLs 22. Using this example, the message may also include an instruction to alternatingly flash price information and employee-directed information.

Regardless of whether the message is a broadcast message or individually-addressed message, if the message requires data to be displayed that is not already stored within one or more of EPLs 22, then EPL software 30 retrieves that data from its data source and places it in the message, along with a memory location for storing the data and an instruction to store the data in the memory location. If memory 54 is already full, new data overwrites existing data in the memory location. EPL software 30 waits to update EPL data file 32 until after display restoration software 34 has logged any overwritten data and instructions.

If a change display message has been sent, operation proceeds to step 64.

In step 64, during the temporary period, display restoration software 34 reads an EPL record in EPL data file 32 to determine previous memory contents of EPL 22.

In step 66, display restoration software 34 determines whether the memory contents have changed following the change display message. If so, operation proceeds to step 68. If not, operation jumps to step 70.

In step 68, display restoration software 34 logs the types of removed data and instructions in restoration data file 36.

In step 70, display restoration software 34 determines whether the record is the last EPL record. If not, operation returns to step 64. If so, operation continues.

During the temporary period, employees may be restocking shelves, taking inventory, and performing other store-related tasks using the information displayed by EPLs 22 as necessary. Operation proceeds until display restoration software 34 determines or receives an indication that the temporary display period has ended, manually or through automatic scheduling.

In step 74, at the end of the temporary period, display restoration software 34 optionally sends a message to EPLs 22 to display only price information if extra time is necessary to return any previously displayed promotional material from restoration data file 36. This message may be a quick broadcast or individually addressed message.

In steps 76–80, display restoration software 34 causes EPL software 30 to send a message to each EPL 22 from which data was removed.

In step 76, display restoration software 34 reads an EPL record in restoration data file 36.

In step 78, display restoration software 34 retrieves data and instructions identified in restoration data file 36. Display restoration software 34 reads the data from other data files as necessary.

In step 80, display restoration software 34 causes EPL software 30 to send a message to the EPL containing the data and instructions to be restored, the memory location for storing the data, and an instruction to store the data in the memory location.

For example, if an EPL 22 was displaying promotional information (e.g., "On Sale") and price information, and the promotional information was removed during the temporary period, display restoration software 34 sends a message containing the promotional information and instructions for displaying the promotional information after the temporary period. Thus, if EPL 22 was alternatingly flashing price and promotional information, them the message would additionally contain the flashing instruction. Likewise, if the promotional data was not removed (because there was enough memory capacity to store it) then only the flashing instruction would be sent to EPL 22.

In step 82, display restoration software 34 determines whether the record is the last EPL record. If not, operation returns to step 76. If so, operation returns to step 62.

Advantageously, the method of the present minimizes temporary storage problems in EPLs 22 having limited memory capacity. Specifically, the present invention automatically tracks and restores data and/or instructions which are removed from EPLs 22 to make room for new data and/or instructions to be displayed by EPLs 22 during a temporary period.

Although the present invention has been described with particular reference to certain preferred embodiments thereof, variations and modifications of the present invention can be effected within the spirit and scope of the following claims.

What is claimed is:

1. A method of restoring primary display information to an electronic price label following a temporary display period during which the electronic price label displays temporary display information comprising the steps of:

(a) determining whether a memory of the electronic price label contains the primary display information during the temporary display period; and (b) if the memory of the electronic price label does not contain the primary display information during the temporary display period, sending a message to the electronic price label containing the primary display information for display following the temporary display period.

2. A method of restoring primary display information to an electronic price label following a temporary display period during which the electronic price label displays temporary display information comprising the steps of:

(a) determining whether the primary display information was removed by the electronic price label from a memory of the electronic price label to initiate the temporary display period; and (b) if the primary display information was removed, sending a message to the electronic price label containing the primary display information for display following the temporary display period.

3. A method of restoring primary display information to an electronic price label following a temporary display period during which the electronic price label displays temporary display information comprising the steps of:

(a) determining whether the primary display information was removed by the electronic price label from a memory of the electronic price label to initiate the temporary display period; and (b) if the primary display information was removed,
storing the primary display information in a data file;
reading the primary display information in the data file at a predetermined time; and
sending a message to the electronic price label containing the primary display information for display following the temporary display period.

4. The method as recited in claim 3, wherein step (b) comprises the substep of:

(b-1) reading the primary display information after the temporary display period.

5. The method as recited in claim 3, wherein step (b) further comprises the substep of:

(b-1) sending another message to the electronic price label before the one message containing instructions to display only price information.

6. The method as recited in claim 3, wherein the primary display information includes primary display characters.

7. The method as recited in claim 3, wherein the primary display information includes primary display instructions.

8. A method of restoring primary display information to an electronic price label following a temporary display period during which the electronic price label displays temporary display information comprising the steps of:

(a) determining whether the primary display information was removed by the electronic price label from a memory of the electronic price label to initiate the temporary display period; and (b) if the primary display information was removed,
storing the primary display information in a data file;
sending a first message to the electronic price label after the temporary period containing instructions to display only price information;
reading the primary display information in the data file; and
sending a second message to the electronic price label containing the primary display information for display following the temporary display period.

9. A method of restoring promotional display information to an electronic price label following a temporary display period during which the electronic price label displays temporary display information comprising the steps of:

(a) determining whether a memory of the electronic price label contains the promotional display information during the temporary display period; and (b) if the memory of the electronic price label does not contain the promotional display information during the temporary display period, sending a message to the electronic price label containing the promotional display information for display following the temporary display period.

10. The method as recited in claim 9, wherein step (a) comprises the substep of:

(a-1) determining whether the memory contains promotional characters and display instructions.

11. The method as recited in claim 10, wherein step (b) comprises the substeps of:

(b-1) if the memory of the electronic price label does not contain the promotional characters, storing the promotional characters; and (b-2) if the memory of the electronic price label does not contain the display instructions, storing the display instructions.

12. The method as recited in claim 11, wherein step (b) further comprises the substeps of:

(b-3) if the memory of the electronic price label does not contain the promotional characters, including the promotional characters in the message; and (b-4) if the memory of the electronic price label does not contain the display instructions, including the display instructions in the message.

13. An electronic price label (EPL) system comprising:

an EPL including a memory containing a plurality of different locations for storing different pieces of information; and a computer which sends a first message to the EPL containing temporary display information to be displayed by the EPL during a temporary display period, determines whether primary display information was removed by the EPL from the memory to store the temporary display information, and, if the primary display information was removed, stores the primary display information in a data file, reads the primary display information in the data file at a predetermined time, and sends a second message to the EPL containing the primary display information for display following the temporary display period.

14. The system as recited in claim 13, wherein the primary display information includes primary display characters.

15. The system as recited in claim 13, wherein the primary display information includes primary display instructions.

* * * * *